United States Patent
Lim et al.

(10) Patent No.: US 6,212,573 B1
(45) Date of Patent: Apr. 3, 2001

(54) MECHANISM FOR INVOKING AND SERVICING MULTIPLEXED MESSAGES WITH LOW CONTEXT SWITCHING OVERHEAD

(75) Inventors: Swee Boon Lim, Mountain View; Ken M. Cavanaugh, III, Montara; Rohit Garg, San Jose, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/670,685

(22) Filed: Jun. 26, 1996

(51) Int. Cl.[7] .................................. G06F 9/00; G06F 9/46
(52) U.S. Cl. ................................. 709/315; 709/108
(58) Field of Search ........................ 395/680, 200.33, 395/676, 500, 200.66, 182.22, 826, 182.02; 709/200.66, 200.34, 310–332

(56) References Cited

U.S. PATENT DOCUMENTS

| | | | |
|---|---|---|---|
| 5,754,752 | * 5/1998 | Sheh et al. | 395/182.02 |
| 5,758,184 | * 5/1998 | Lucovsky et al. | 395/826 |
| 5,805,823 | * 9/1998 | Seitz | 709/200.66 |
| 5,809,235 | * 9/1998 | Sharma | 709/200.6 |
| 5,815,653 | * 9/1998 | You et al. | 395/183.14 |
| 5,822,525 | * 10/1998 | Tafoya et al. | 709/200.34 |
| 5,835,763 | * 11/1998 | Klein | 709/101 |
| 5,884,022 | * 3/1999 | Callsen et al. | 395/182.22 |

OTHER PUBLICATIONS

Hagman, Concurrency Within DOE Object Implementations, May 27, 1993.*
Bershad et al, User Level Interprocess Communication for Shared Memory Multiprocessors, ACM pp 175–198, 1991.*
Sunsoft, Multithreaded Programming Guide, 1994.*
OMG, Corba Revision 2.0, Jul. 1995.*

* cited by examiner

Primary Examiner—Majid A. Banankhah
Assistant Examiner—P. G. Caldwell
(74) Attorney, Agent, or Firm—Beyer Weaver & Thomas, LLP (57) ABSTRACT

Data structures, methods and devices for reducing computing overhead by utilizing threads which are effective to listen for requests for new connections, for new requests for services, and process requests for services in a distributed client/server-based object oriented operating system are disclosed. In one aspect of the invention, a method of processing a request for service from a client, involves listening for a request using a first server side thread which is effective to listen for and process requests on a connection, reading the header of the request using the first server side thread, and processing the request. In another aspect of the invention, a client writes a request for service on a connection between the client and a server using a first client side thread which is effective for dispatching requests and listening for replies to the request, and determines whether a reply from the server is expected in response to the request for service.

19 Claims, 9 Drawing Sheets

MECHANISM FOR INVOKING AND SERVICING MULTIPLEXED MESSAGES WITH LOW CONTEXT SWITCHING OVERHEAD

BACKGROUND OF THE INVENTION

1. Field of Invention

The present invention relates to the fields of distributed object computing systems, client-server computing, and object-oriented programming. More particularly, the invention relates to methods and devices for servicing requests received by a server in a distributed object system.

2. Description of Prior Art

A computing environment in which objects located on different computers are linked by a network is typically referred to as a client-server computing environment. Some of the objects act as providers of services or functionality to other objects. Others of the objects or entities act as consumers of services or functionalities. The client-server model may also be generalized to the case where distinct programs running on the same computer communicate with one another through some protected mechanism and act both as providers and consumers of a service or functionality. Thus, distributed objects may exist anywhere in a network, as for example in the address space of the client, in multiple address spaces on the client machine, and in multiple machines across the network.

Attempts to provide such a distributed system have been made using object-oriented methodologies that are based upon a client-server model in which server objects provide interfaces to client objects that make requests of the server objects. Typically, in such a distributed system, the servers are objects consisting of data and associated methods. The client objects obtain access to the functionalities of the server objects by executing calls on them, which calls are mediated by the distributed system through an Object Request Broker (ORB) which is used to locate the various distributed objects and to establish communications between objects. When the server object receives a call, it executes the appropriate method and transmits the result back to the client object.

The software industry has responded to the need for a distributed object technology by forming the Object Management Group (OMG). The goal of the OMG is to define the Object Management Architecture (OMA), which has four major components: the Object Request Broker (ORB), Object Services, Common Facilities, and Application Objects. The Object Request Broker provides basic object communications and management services, thereby forming the basis of a distributed object system. A standard for an Object Request Broker is contained in the Common Object Request Broker Architecture (CORBA) specification.

In a distributed object system, a client may initiate a connection with a server. The connection established is a "line," i.e. a communications pathway, through which the client and the server may communicate. A line may be established between any pair of processes; however, the number of lines allowed between a client and a server is limited. As such, requests and replies between a client and a server may be multiplexed to enable the use of only one line between a given client-server pair. That is, a single line may be used for multiple requests and replies.

On the server side of a distributed object system which handles multiplexed requests and replies, threads are often used to service requests. Threads may be thought of as "sketch pads" of storage resources. In other words, threads are portions of memory which are allocated to hold execution states. To an operating system, all threads appear to be the same. However, the logic assigned by a programmer, i.e. the responsibilities assigned to a particular thread, for each thread are typically different. For a typical client-server pair which processes multiplexed requests, a single listener, or collector, thread on each end point or port on the server side is assigned the task of "listening" for requests. That is, the "listener" thread monitors the lines between the client-server pair and awaits requests to be made. Once the listener thread collects a request, it passes the request to an appropriate "worker" thread, or non-listener thread which is associated with the same connection as the listener thread, that services the request and returns the results of the service to the client. Each worker thread is assigned a specific task, and the listener thread routes requests to the appropriate worker thread for the request. The passing of a request from the listener thread to a worker thread is known as a "context switch." A context switch requires the operating system to save the execution state of the thread which is currently running, and to restore the thread which is scheduled to run next. In typical distributed object systems, at least one context switch is required on the server side to route a request for service from the listener thread to the appropriate worker thread for the request.

The configuration of the threads on the client side of a distributed object system is similar to the architecture of the threads on the server side. On the client side, after a request has been sent to the server side, a single listener thread listens for responses, or replies, on the connection to be sent from the server side. Once a response is received by the listener thread, the listener thread passes the response to the appropriate caller thread. The caller thread is the thread that initiated the object invocation or request. It blocks until a reply has been received. As before, the act of a listener thread passing a response to an appropriate caller thread is known as a context switch. In typical distributed object systems, the client side requires at least one context switch.

Neither the listener thread on the client side nor the listener thread on the server side processes any requests or responses. As such, the number of context switches in a client-server pair is at least two when a response is required from the server, i.e. there is one context switch on the server side when a request is received, and there is one context switch on the client side when a response is received. It follows that the minimum number of context switches in a client-server pair is one; this minimum number occurs when a response from the server is not required once a request is received or processed. Due to the fact that the computing overhead associated with context switches is typically high, it would be desirable to develop a method which reduces the minimum number of context switches in a client-server pair to zero. A reduction in the minimum number of context switches would reduce the amount of computing overhead and, more importantly, the latency associated with processing requests, thereby improving the overall efficiency of a distributed object computing system.

SUMMARY OF THE INVENTION

To achieve the foregoing and other objects and in accordance with the purpose of the present invention, data structures, methods and devices for reducing computing overhead by utilizing threads which are effective to both listen for and service requests in a distributed client/server based object oriented operating system are disclosed.

In one aspect of the invention, a method of processing a request for service from a client, involves listening for a request using a first server side thread which is effective for listening for requests for new connections, listening for new requests for services, and processing requests for services on a connection, reading the header of the request using the first server side thread, determining whether the first server side thread is effective for processing the request, and servicing the request. In one embodiment, if it is determined that the first server side thread is ineffective for processing the request, then the request is dispatched to a second server side thread, also with the capability of both listening for requests and servicing requests, which is appropriate for servicing the request when the first server side thread is determined to be ineffective for processing the request.

In another aspect of the invention, a client writes a request for service on a connection between the client and a server using a first client side thread which is effective for dispatching requests and listening for replies to the request, and determines whether a reply from the server is expected in response to the request for service. If a reply is expected, a response record which corresponds to the request for service is created, and the response record is added to a response list which includes all response records for the client. In some embodiments, when an expected reply is received, the reply is processed by determining whether the first client side thread is appropriate for receiving the reply from the server, and dispatching the reply from the server to a second client side thread with the capability of both dispatching requests and listening for replies when it is determined that the first client side thread is inappropriate for receiving the reply.

In still another aspect of the invention, a response record data structure contains information corresponding to a request for service issued by a thread which requires a reply. The request record data structure includes a request identifier which identifies the request for service, a thread identifier which identifies the thread which issued the request for service, and an event port identifier which identifies an implementation state corresponding to the request for service. In some embodiments, the response record data structure may also include information corresponding to the request for service which is not specified by the request identifier, the thread identifier, or the event port identifier.

These and other features and advantages of the present invention will be presented in more detail in the following detailed description of the invention and in the associated figures.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The detailed description of the invention is divided into two sections; the first section is a description of distributed object systems in general, and the second section is a description of unique all-purpose threads which may function as both listener threads and worker threads.

1. Background of Distributed Object Systems

Figure 1:
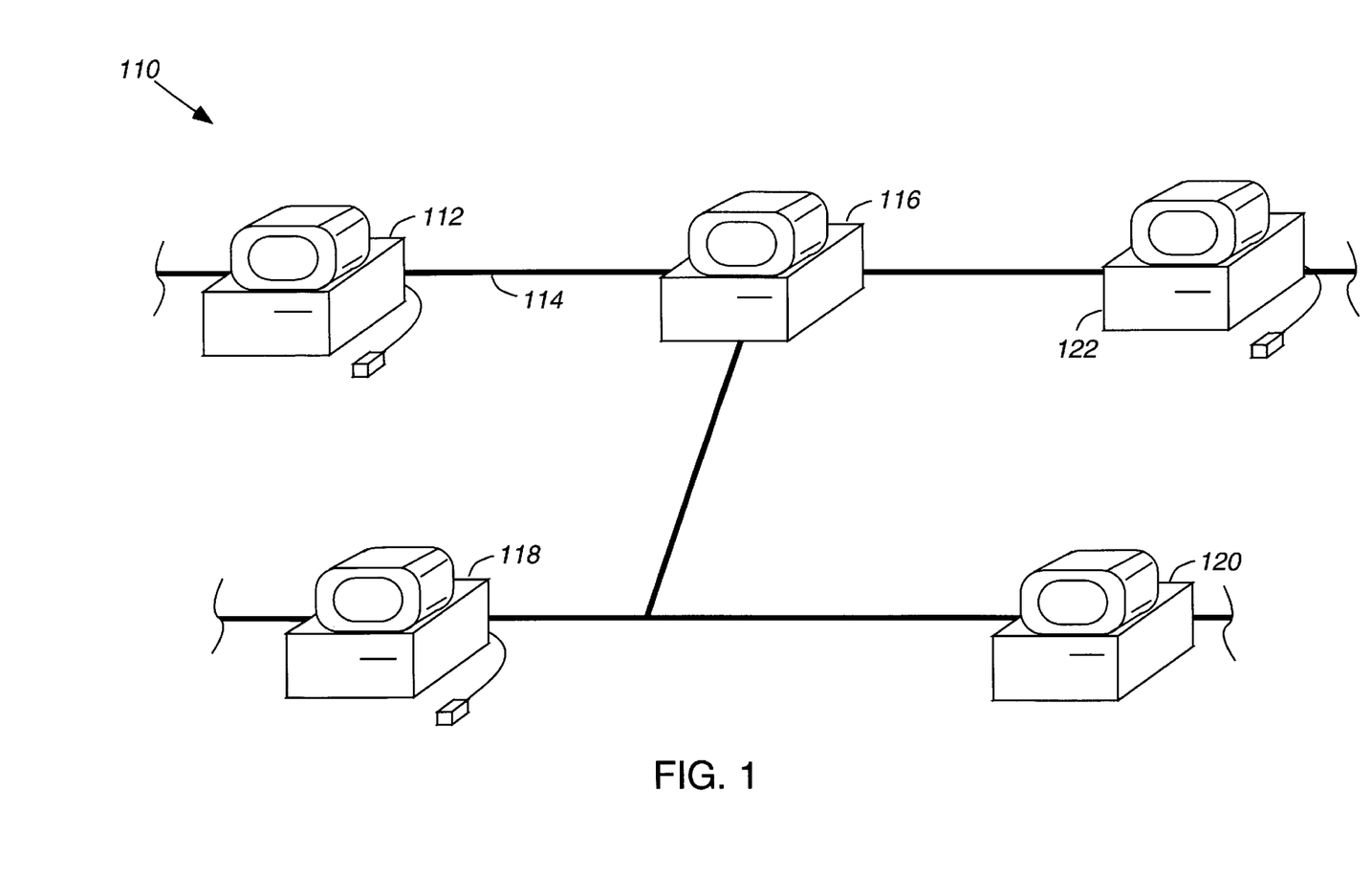
FIG. 1 is a pictorial illustration of various computers linked together in a computer network.

The present invention will now be described in detail with reference to embodiments thereof as illustrated in the accompanying drawings. In one embodiment of the present invention, distributed objects and computer processes are resident on one or more computers linked together by a network. The network may take any suitable form. By way of example, a representative network arrangement 110 is illustrated in FIG. 1. Network arrangement 110 includes a first computer 112 which is coupled to a transmission line 114. Network arrangement 110 further includes a server, router or the like 116 in addition to other computers 118, 120, and 122 such that data and instructions may be passed among the networked computers. The design, construction, and implementation of computer networks will be familiar to those of skill in the art.

Figure 2:
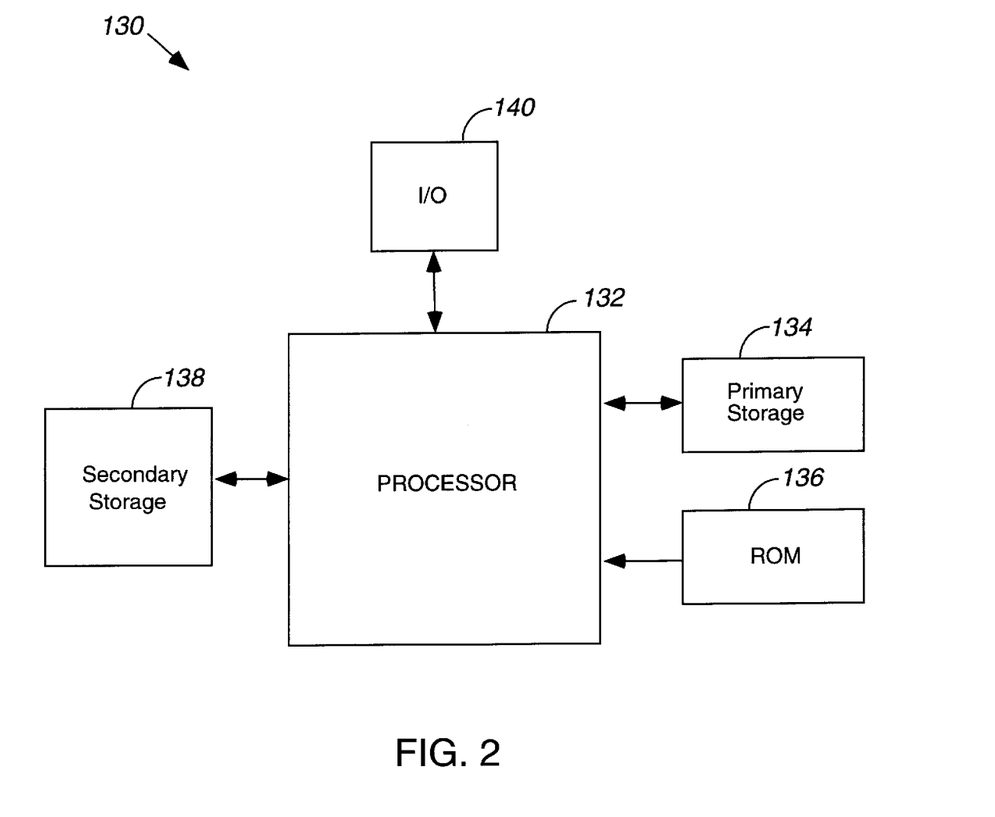
FIG. 2 is a diagrammatic illustration of the major components of a computer as shown in FIG. 1.

A representative computer 130 suitable for use as computers 112, 118, 120, and/or 122 of FIG. 1 is illustrated schematically in FIG. 2. Computer 130 includes a processor 132, which may be a central processing unit (CPU) that is coupled bi-directionally with a primary storage device 134, which may be a random access memory (RAM), and unidirectionally with another primary storage device 136, which may be read only memory (ROM). Typically, RAM 134 is used as a "scratch pad" memory and includes programming instructions and data, including distributed objects and their associated code and state, for processes currently operating on CPU 132. ROM 136 typically includes basic operating instructions, data, and objects used by computer 130 to perform its functions. In addition, a mass storage device 138, such as a hard disk, CD ROM, magneto-optical (floptical) drive, tape drive or the like, is coupled bi-directionally with CPU 132. Mass storage device 38 generally includes additional programming instructions, data, and objects that typically are not in active use by CPU 132, although the address space may be accessed by CPU 132, e.g., for virtual memory or the like. Each of the above described computers optionally includes an input/output source 140 that typically includes input media such as a keyboard, pointer devices (e.g., a mouse or stylus) and/or network connections. Additional mass storage devices (not shown) may also be connected to CPU 132 through a network connection. It will be appreciated by those skilled in the art that the above described hardware and software elements, as well as the networking devices, are of standard design and construction, and will be well familiar to those skilled in the art.

Figure 3:
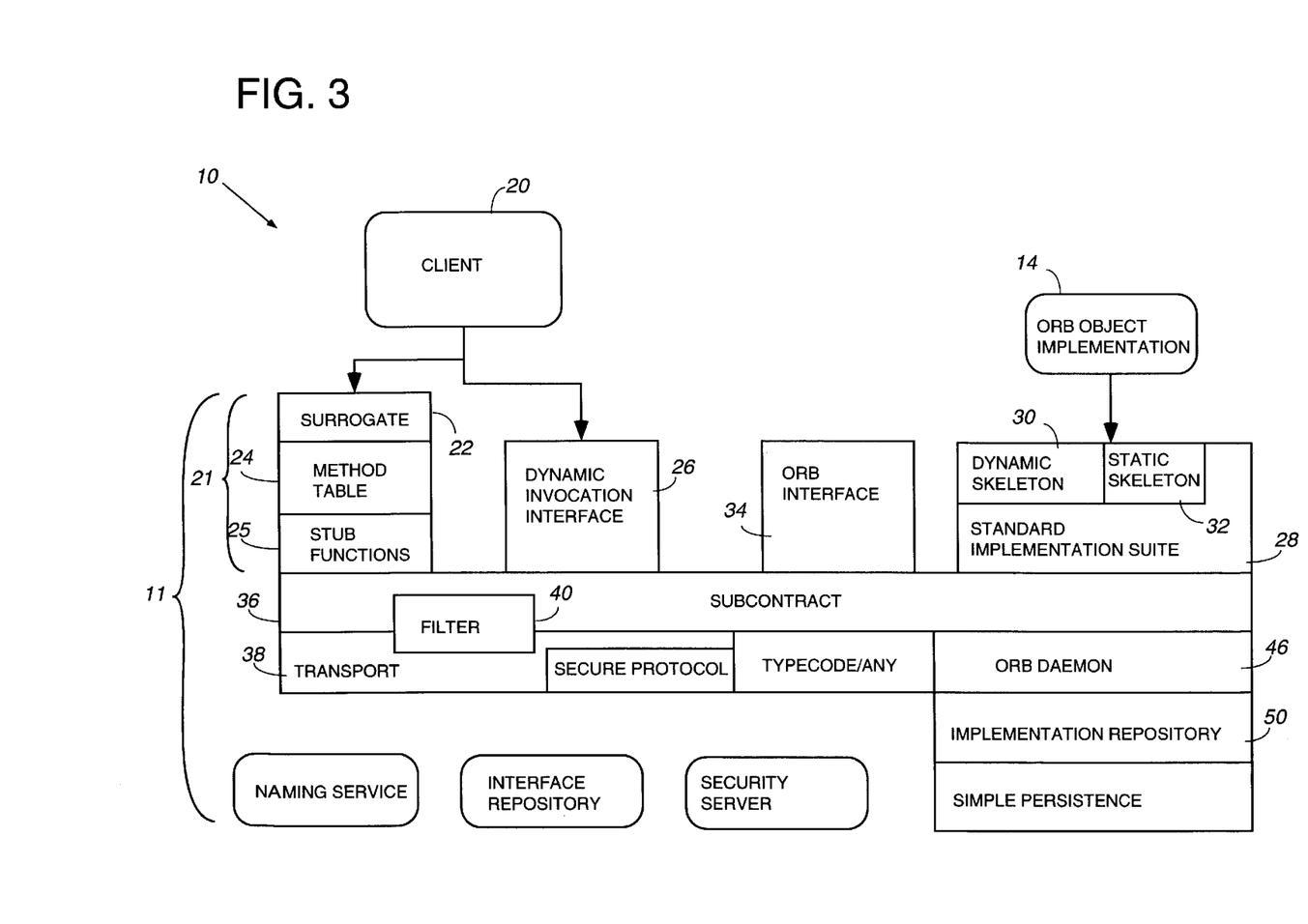
FIG. 3 is a diagrammatic illustration of the overall architecture of a representative distributed object system suitable for implementing the present invention.

FIG. 3 diagrammatically illustrates the overall architecture of a representative distributed object system suitable for implementing the present invention. The present invention may be practiced within the context of any suitable distributed object system, including those defined under CORBA or any other suitable specification. However, for purposes of illustration, the present invention will be described primarily within the context of an Object Request Broker (ORB) implemented under the CORBA specification from the OMG, Revision 2.0, dated July 1995, which is incorporated herein by reference.

A distributed object system 10 typically includes an Object Request Broker (ORB) 11, as is symbolically illustrated in FIG. 3. ORB 11 provides all of the location and transport mechanisms and facilities necessary to deliver a call from a client to a servant (target object) and to return a response to the client. The client and servant may be located in the same process, in different processes on the same machine, or on completely different machines. For the purposes of this discussion, client 20 may be any code that invokes an operation on a distributed object and thus may or may not take the form of distributed object or a process. ORB object implementation 14 is a representation of an object type defined in a traditional object programming language, such as C++. A wide variety of representations are possible. By way of example, an object implementation 14 may be a simple C++ object type that has been provided by an application developer.

Client 20 communicates with a servant by way of a stub 21, a subcontract layer 36, possibly a filter 40, and a transport layer 38. Stub 21 includes a surrogate 22, a method table 24, and a stub function 25. Client 20 communicates initially with surrogate 22 which appears to the client as the server object. Alternatively, client 20 may communicate directly with the server object through a dynamic invocation interface (DII) 26 instead of through surrogate 22, method table 24, and stub function 25. Dynamic invocation interface 26 is used to enable clients, as for example client 20, to construct dynamic requests.

Transport layer 38 operates to physically transport information to and from a servant that typically does not share the same process as a client. Multiple threads exist in transport layer 38 on both the client side and the server side. On the client side, threads dispatch requests for service to the server side, and also listen for responses to the requests for service. On the server side, threads in transport layer 38 listen for requests for service, and process requests for service.

A standard implementation suite 28 (or object adapter) interacts with ORB objects 14. A skeleton, which may take the form of either static skeleton 32 or dynamic skeleton 30, is used to transform requests into a format required by a servant object 14. Thus, skeletons 32, 30 call an appropriate servant object 14. Static skeleton 32 is used to call interface-specific object implementations 14, while dynamic skeleton 30 is used generically when interface-specific objects are not available.

An ORB Daemon 46 is responsible for ensuring that object servers are active when invoked by clients. A technique for starting object servers is disclosed in U.S. patent application Ser. No. 08/408,645 which is hereby incorporated by reference.

An implementation repository 50 is used to store information relating to object servers. Specifically, implementation repository 50 stores the information needed to start a server process. For example, implementation repository 50 stores information such as the location of to the server program, any arguments to the program, and any environment variables to pass to the program, etc.

2. Description of Unique All-purpose Threads

When requests are transferred from a client to a server, they are typically transferred via connections between the transport layers of the client and the server. Each end of a connection, that is, both the client side of a connection and the server side of a connection, may be monitored by threads. Threads are pieces of memory allocated to hold execution states. From the point-of-view of the operating system, all threads are the same, and may be thought of as sketch pads for resources associated with the client and the server. Typically, threads are assigned responsibilities by a software developer. On each end of a connection, there is usually a "listener" thread and at least one "worker" thread. The listener thread is assigned the responsibility of monitoring the connection for new connection requests and servicing requests, if the thread is associated with the server, or responses to requests, if the thread is associated with the client. Additionally, the server and the client listener threads are assigned the responsibility of dispatching either requests to an appropriate server-side "worker" thread or an appropriate client-side "caller" thread, or client thread, respectively. Worker threads associated with the server service requests and, if required, return a reply to the requesting client. Client threads transmit requests over a connection to the server, and may require replies from the server.

In conventional client-server systems, listener threads do not transmit or service requests. Instead, listener threads in typical client-server systems must "hand off" or dispatch requests and responses to appropriate threads. This dispatching of requests and responses is known as a "context switch." As the performance overhead associated with context switches is high, reducing the minimum number of context switches which are necessary to service a request would improve the efficiency of the overall process of servicing requests. In addition, the context switching time increases latency. For situations in which the client requires a response to a request, a total of two context switches, one context switch on the server and one context switch on the client, is required to service a request. It should be appreciated that for situations in which the client does not require a response to a request, only a single context switch on the server is required.

In one aspect, the present invention provides an "all-purpose" thread on the client as well as on the server. Each all-purpose thread on the client, referred to herein as a "client" thread, is capable of both issuing requests on a connection and listening for and dispatching responses received on the connection to other client threads which issued requests on the same connection. Each all-purpose thread on the server, referred to herein as a "worker" thread, is capable of listening for new connections, accepting new connections, monitoring a connection for a request, and servicing requests. The use of all-purpose threads reduces the minimum number of context switches necessary to service a request. No context switching is required on the server in the event that the request received by a worker thread in accordance with the present invention is a request which the worker thread may itself process. Similarly, when a response to a request is received by the client thread, no context switching is necessary if the response is directed at the client read which received the response. Hence, the minimum number of context switches is zero, and the efficiency of the process of servicing requests is improved.

Figure 4:
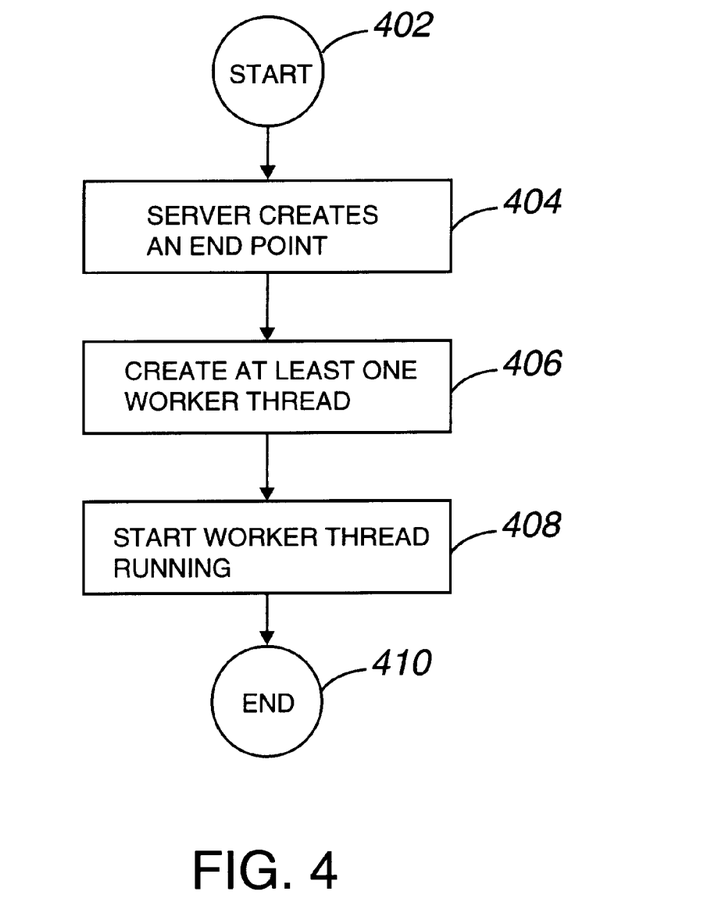
FIG. 4 is a process flow diagram which illustrates the steps associated with the initialization of an endpoint on the server side of a client-server system in accordance with one embodiment of the present invention.

As will be appreciated by those skilled in the art, threads on the server are typically created and assigned responsibilities when the server creates and initializes an end point. Referring next to FIG. 4, the process of initializing an end point on the server side of a client-server system will be described in accordance with one embodiment of the present invention. A server-side end point may be defined to be a port on which the server may listen for connections. Each server side end point may have an associated list of connections which are accepted by the server. In some embodiments, end points and connections associated therewith may utilize TCP/IP protocols. The process of initializing an end point begins at a step 402. In a step 404, the server creates an end point. In other words, the server opens a port on which the server may accept new connections. Initially, the list of accepted connections is empty. End points on the server "live in," i.e. are a part of, the transport layer of the server. The general structure of a server side end point will be described below with reference to FIG. 10. After the end point is created in step 404, process flow moves to step 406 where at least one worker thread is created to monitor the end point. In other words, at least one worker thread is created to service the end point created in step 404. In the described embodiment, the worker threads created are all-purpose, or general purpose, threads which not only listen for new connection requests on a port and listen for service requests on the list of connections, but also serve to service requests. In conventional client-server environments, a designated listener thread is needed to listen for and delegate requests to conventional worker threads which serve only to process requests. Hence, in a conventional client-server environment, there are no general purpose, or all-purpose, threads, as threads either only listen for or only process requests.

Figure 5:
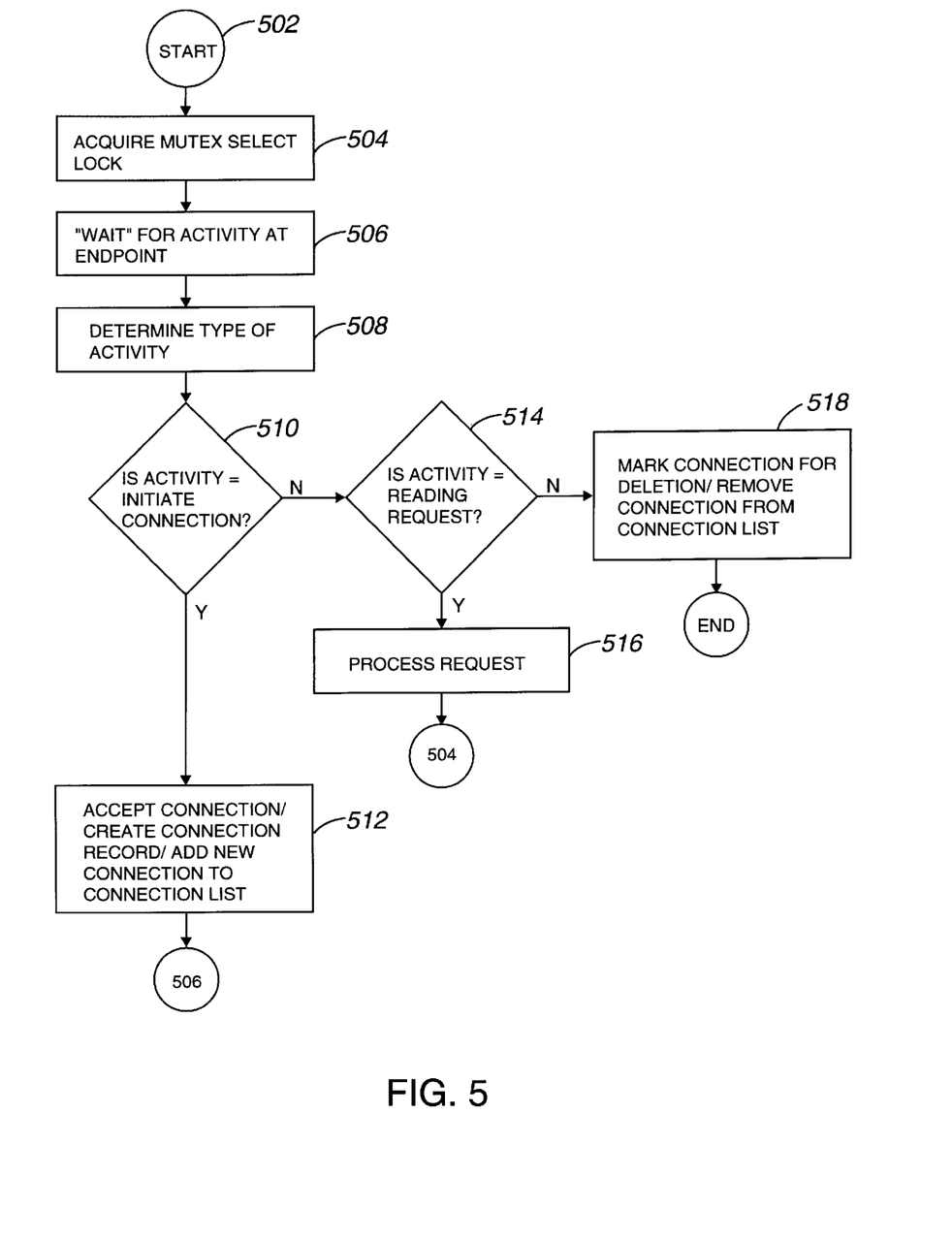
FIG. 5 is a process flow diagram which illustrates the steps associated with worker thread operation and logic on the server side of a client-server system in accordance with one embodiment of the present invention.

After worker threads, i.e. all-purpose threads of the described embodiment, are created in step 406, process control proceeds to step 408 in which the worker threads created begin to "run," i.e. the worker threads are ready to operate, as will be described below with reference to FIG. 5. In general, only one worker thread at a time may monitor a given end point. In order to ensure that only a single worker thread at a time is used to monitor the end point, when an end point is created, the end point is typically associated with a mutex select lock, which, as will be described below with reference to FIG. 5, is acquired by the worker thread which will listen for service requests. After the created worker threads begin to run the process of initializing an end point is completed in step 410.

Once an end point is created and the worker threads associated with the end point begin to run, the end point is ready to receive requests for new connections and for service. Specifically, the worker threads are prepared to monitor the end point for activity. Requests for service are transferred or dispatched to the end point through connections with the requesting client. In some embodiments, a new connection, or line, may be opened for each service request. In other embodiments, service requests may be multiplexed on a single connection. That is, more than one type of service request may use the same connection at the "same" time. The use of the same connection at the same time does not imply that service requests are transmitted simultaneously. The implication is that, by way of example, a first service request which requires a response may be dispatched to a server, and a second service request may be dispatched after the first request, but before the response to the first request is dispatched from the server to the client. Hence, service requests may be multiplexed on a single connection.

FIG. 5 is a process flow diagram which illustrates the steps involved with the operation of a worker thread which services a server side end point in accordance with an embodiment of the present invention. The process begins at step 502. In step 504, the mutex select lock is acquired by a worker thread. As previously stated, the term "worker thread," when used in the context of the present invention, represents the "all-purpose" thread which both listens for and services requests received on a server side end point. The mutex select lock is a lock which provides exclusive access to the end point for the worker thread which possesses the lock. Hence, there is only one mutex select lock for all worker threads which service a server side end point as only the worker thread which possesses the mutex select lock may begin operation. In step 506, the worker thread in operation, i.e., the worker thread which possesses the mutex select lock, "waits" for activity at the end point it is monitoring. The worker thread is inactive until there is activity at the end point with which it is associated. When there is activity at the end point, process control proceeds to step 508 where the type of activity at the end point is determined. There are ordinarily three types of activities which may occur at the end point. A first activity is a request by a client for a connection. A second activity is a reading request from a specific existing connection. A third activity is a request to close down an existing connection.

After the type of activity at the end point is determined in step 508, process control proceeds to step 510, which is the determination of whether the type of activity at the endpoint is a request for the initiation of a connection. If the determination is affirmative, that is, if the activity is a request for the initiation of a connection, the request for a connection is accepted, and a connection record is created in step 512. In addition, the new connection is added to the list of connections on the end point. Each end point has an associated connection list. After the request to initiate a connection is accepted, process control then returns to step 506, in which the worker thread once again "waits" for activity at the end point.

If the determination in step 510 is that the activity at the end point is not a request for the initiation of a connection, process control moves to step 514, which is the determination of whether the activity is a reading request, i.e. a request to receive and read data, on an existing connection. If it is determined that the activity is a reading request, the request is processed in step 516. The steps associated with processing a request to read are described below with respect to FIG. 6. After the reading request is processed, process control returns to step 504 and the acquisition of the mutex select lock. It should be appreciated that the mutex select lock is released during the course of processing a reading request in step 516. Hence, the mutex select lock is free to be acquired in step 504 after the reading request is processed.

If it is determined in step 514 that the activity at the end point is not a reading request, then in the current embodiment, the activity is considered to be a request to close down the connection. That is, the activity at the end point is a request for the deletion of the connection. In step 518, the current connection is marked for deletion, and the connection is removed from the connection list.

Figure 6:
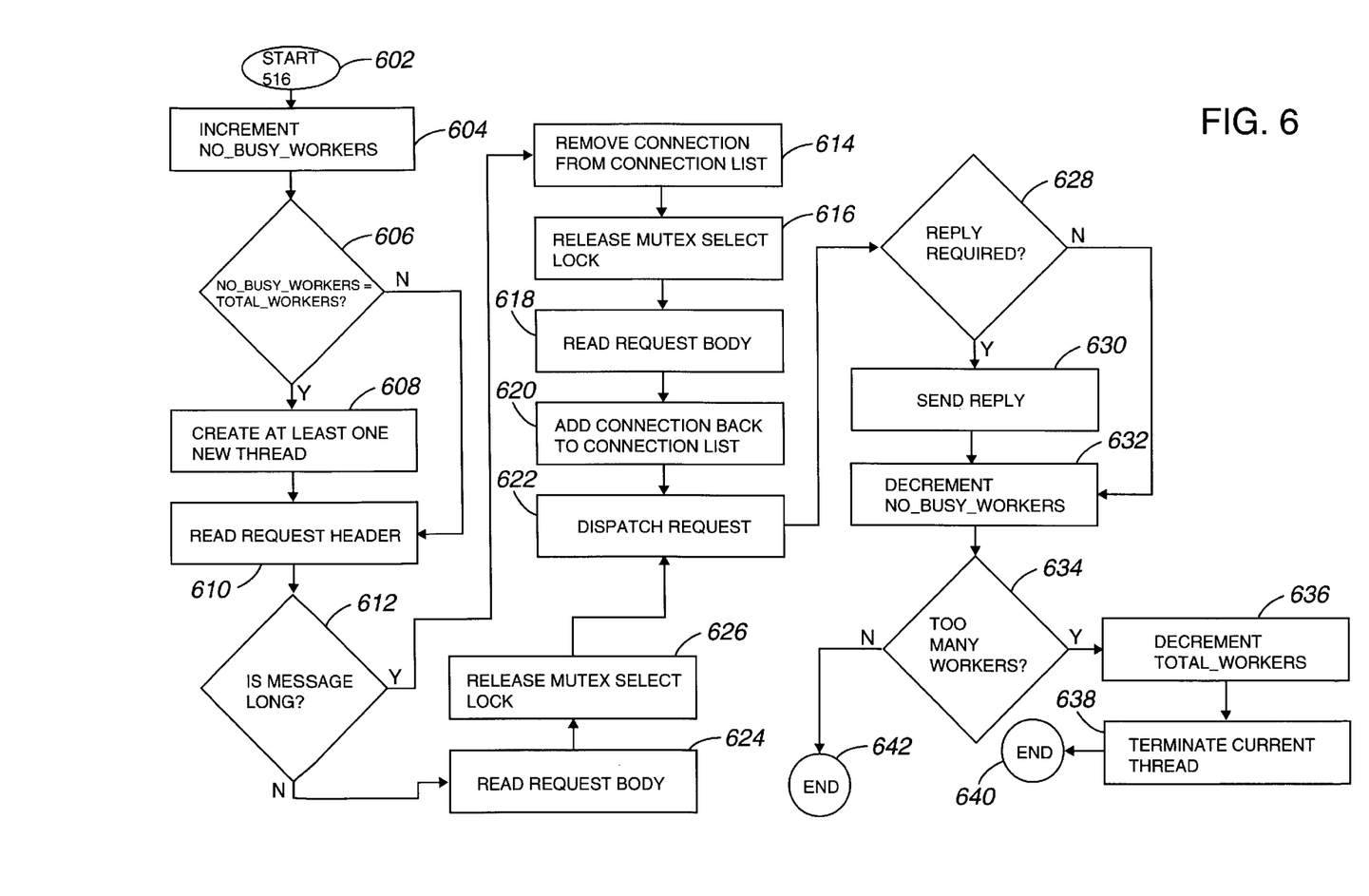
FIG. 6 is a process flow diagram which illustrates the steps associated with processing a request received by the server side of a client-server system, i.e. step 516 of FIG. 5, in accordance with one embodiment of the present invention.

Referring next to FIG. 6, a method of processing a reading request, i.e. step 516 of FIG. 5, will be described in accordance with an embodiment of the present invention. The method of processing a reading request begins at step 602. From step 602, process control proceeds to step 604 where the number of busy worker threads, represented by variable NO_BUSY_WORKERS, is incremented. The number of busy worker threads is incremented to reflect that the worker thread processing the current thread is "working," i.e. active. After the number of busy worker threads is incremented in step 604, process control proceeds to step 606 where a determination is made regarding whether the number of busy worker threads is equal to the total number of worker threads. That is, a determination is made as to whether NO_BUSY_WORKERS is equal to TOTAL_WORKERS. The total number of worker threads initially available on a server is a dynamic, configurable parameter. If it is determined in step 606 that NO_BUSY_WORKERS is equal to TOTAL_WORKERS, at least one additional worker thread is created using standard methods for spawning new threads. The methods used to spawn new threads are well known to those skilled in the art. TOTAL_WORKERS is then incremented to reflect the new total number of worker threads after additional worker threads are created. If it is determined in step 606 that NO_BUSY_WORKERS is not equal to TOTAL_WORKERS, process control proceeds directly from step 606 to step 610 where the worker thread which possesses the mutex select lock reads the request header.

After additional worker threads are created to wait for requests, the worker thread which possesses the mutex select lock is used to read the request header in step 610. It should be appreciated that in a logical sense, NO_BUSY_WORKERS may not be greater than TOTAL_WORKERS. Hence, if the determination is made in step 606 is that NO_BUSY_WORKERS is not equal to TOTAL_WORKERS, NO_BUSY_WORKERS is less than TOTAL_WORKERS.

In step 610, as stated above, the request header is read by the current worker thread, i.e. the worker thread which acquired the mutex select lock as previously described with respect to FIG. 5. Information contained in the request header includes, for example, information regarding the length of the message, or more specifically, the length of the text of the message, contained in the request. A determination is made in step 612 as to whether the message contained in the request is considered to be a long message. If the determination is affirmative, that is, if the message contained in the request is long, the current connection is removed from the connection list in step 614. Removing the current connection from the connection list serves the purpose of ensuring that the current connection may not be selected while the long message is being read.

Once the current connection is removed from the connection list, the mutex select lock is released in step 616. The release of the mutex select lock, in addition to the removal the current connection from the connection list, serves to ensure that while the current worker thread is reading the long message, no other worker thread will be reading from the current connection. The release of the mutex select lock, however, does enable another worker thread to acquire it and wait for the next activity at the end point. If another reading request is received, then the worker thread may process the request. Hence, it is possible to multiplex requests received by an end point. It should be appreciated that the connection on which the new reading request is received may not be the current connection, by virtue of the fact that the current connection has been deleted from the connection list.

After the mutex select lock is released in step 616, the body of the request is read in step 618. Methods which may be used to read the body of the request may usually involve converting data that is in a format which corresponds to a particular network communications protocol into a packet of information that is meaningful in a non-network environment. In other words, before the body of a request may be read, data which is a part of the request is typically converted from a format used to transfer data between different domains into readable information. After the body of the request is read, process control moves to step 620 where the connection which was removed in step 614 is added back to the connection list. The request is then dispatched "up the stack," i.e. the request is serviced by the thread. One method of dispatching a request up the stack is described in U.S. patent application Ser. No. 08/670,700 which is incorporated herein by reference.

If it is determined in step 612 that the message contained in the request is short, process control proceeds to step 624 where the body of the request is read. After the body of the request is read, the mutex select lock is released in step 626. The release of the mutex select lock provides the opportunity for another worker thread to acquire it and monitor the end point for activity, as was previously described. Process control moves from the step of releasing the mutex lock to step 622 where the request is dispatched up the stack.

After the request is dispatched, a determination of whether a reply is required is made in step 628. In some instances, the client which originated the request to the server may require that the server send a reply in response to the request. In other instances, the client may not require a reply. If a reply is required, a reply is sent to the client in step 630. The process of sending a reply will be subsequently discussed with respect to FIG. 7. After a reply is sent, the number of busy worker threads, i.e. NO_BUSY_WORKERS, is decremented in a step 632 in order to reflect that fewer worker threads are active. If a reply to the request is not required, process control proceeds directly from the determination that a request is not required to step 632 where NO_BUSY_WORKERS is decremented.

Once NO_BUSY_WORKERS has been decremented in step 632, a determination is made in step 634 regarding whether too many worker threads are in existence for the end point. It should be appreciated that a worker thread is created in step 608 when all available worker threads are busy. All available worker threads may be busy due to heavy demands on the server. When the load on the server decreases, the resources associated with any "extra" worker threads, or worker threads which are not needed during steady state operation of the server, may be reclaimed. If it is determined that there are too many total worker threads, TOTAL_WORKERS is decremented in step 636, and the current worker thread is terminated in step 638. This indicates that the control flow terminates. On the other hand, if the determination in step 634 is that the number of worker threads is appropriate, no further steps are required, and the request is considered to be completely processed, and control returns to step 504.

Figure 7:
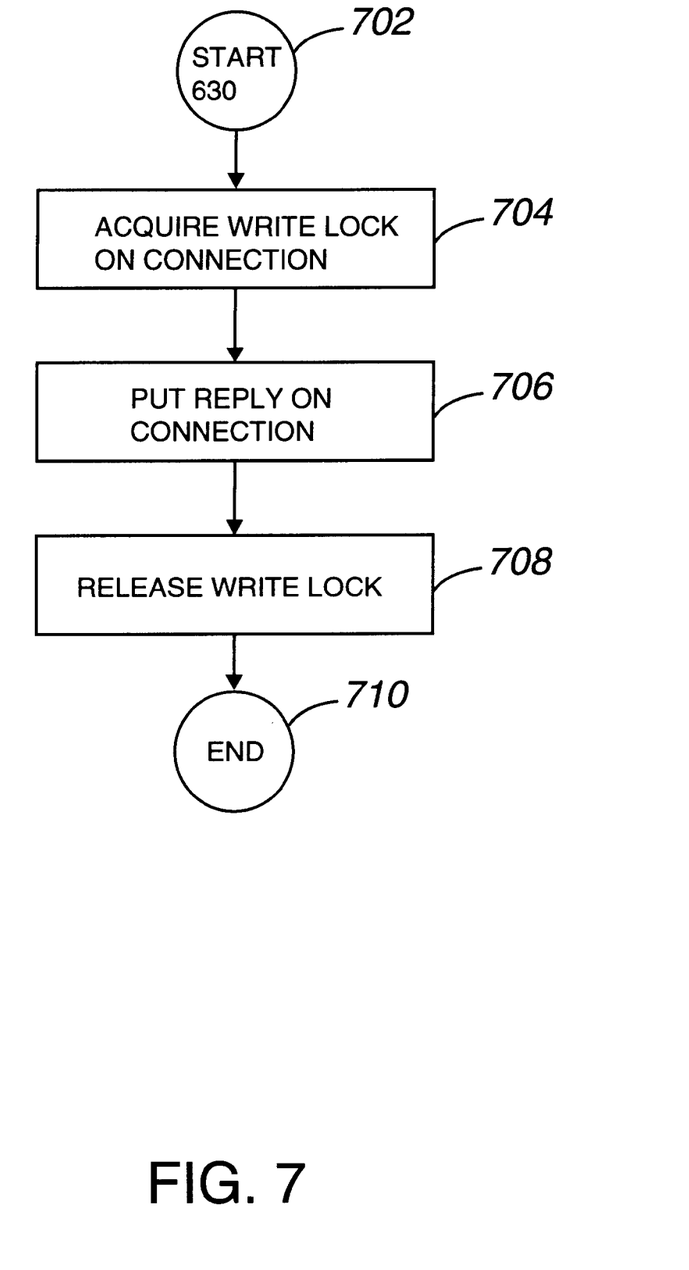
FIG. 7 is a process flow diagram which illustrates the steps associated with sending a reply from the server side of a client-server system, i.e. step 530 of FIG. 7, in accordance with one embodiment of the present invention.

Referring next to FIG. 7, a method of sending a reply from the server to the client, i.e., step 630 of FIG. 6, will be described in accordance with an embodiment of the present invention. The process of sending a reply to a requesting client begins at step 702. In step 704, the write lock for the connection on which the reply is to be sent is acquired by the worker thread which will be sending the reply. Typically, the worker thread which will be sending the reply is the worker thread which received the request. A write lock for each connection on which multiplexed replies are to be sent is necessary to prevent overlapping replies from being sent, as only the worker thread which has acquired the write lock for a connection may send a reply on the connection. Hence, a worker thread may have to wait to acquire the write lock for a connection in the event that the write lock is in use by a different worker thread. From the step of acquiring the write lock, process control proceeds to step 706 where the reply is placed on the connection. After the reply is placed on the connection, the write lock is released in step 708. The process of sending a reply then ends at step 710.

The reply sent by a server is received by the client, and is typically delivered to the worker thread on the client-side, i.e. the client thread, which originated the request for service that corresponds to the reply. As was the case for the server-side worker threads, the client thread is an all-purpose thread when referred to in the context of the present invention. The client thread initially originates the service request when it receives a method call. After receiving a method call, the client thread transmits the service request to the server. The client threads create service requests, transmit the service requests to the server, and monitor connections in the event a response to the service request is expected. Once a response is received, it is then delivered to the appropriate client thread. For situations in which the response is received by the client thread which transmitted the request corresponding to the response, no context switch is required. As described above, reducing the number of context switches required in the overall processing of a service request reduces the performance overhead associated with the processing.

Figure 8:
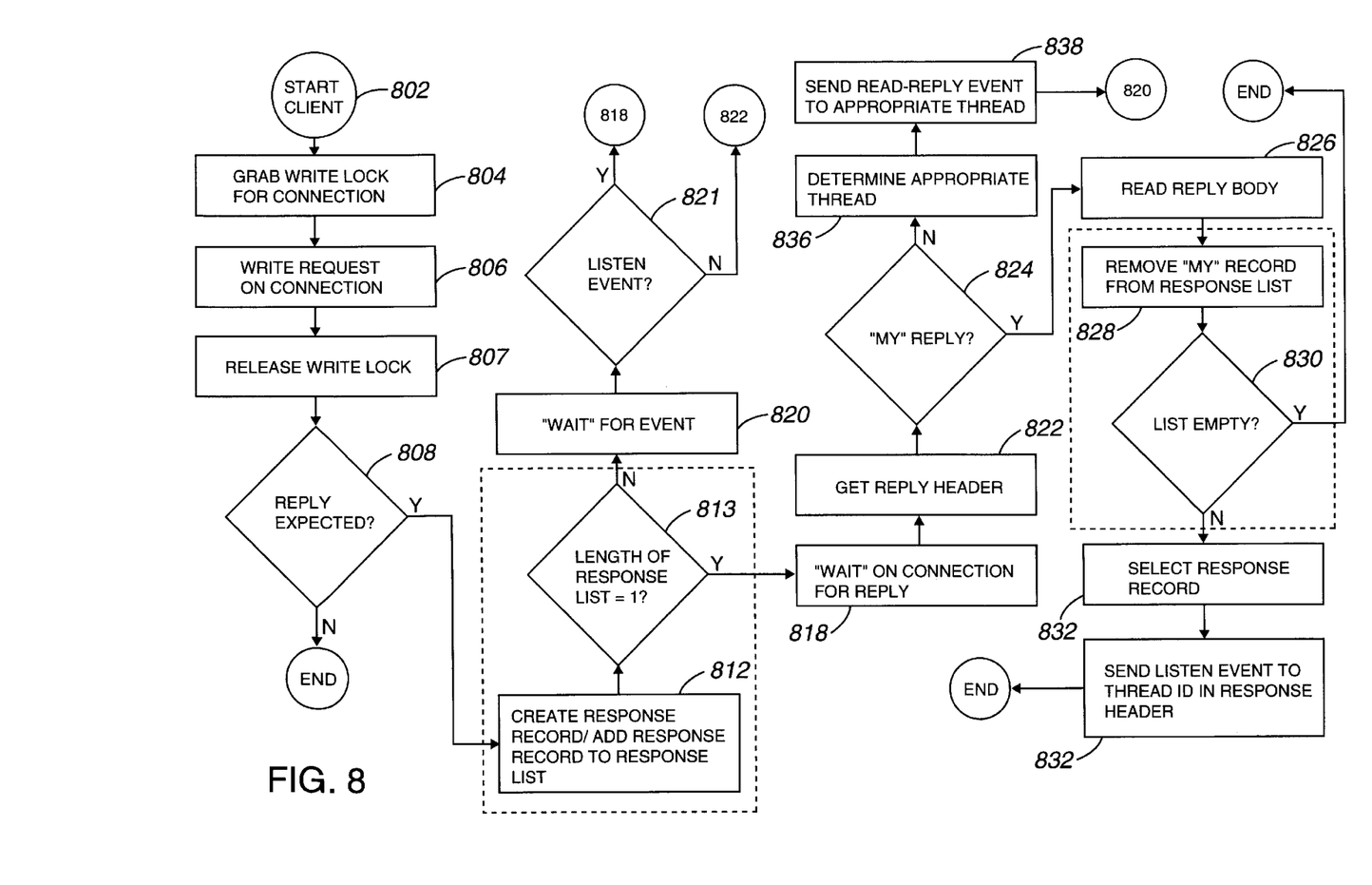
FIG. 8 is a process flow diagram which illustrates the steps associated with sending requests and receiving replies on the client side of a client-server system in accordance with one embodiment of the present invention.

Referring next to FIG. 8, there is shown a process flow diagram which illustrates the steps associated with a client thread, which monitors a connection on the client, writing or dispatching requests to and receiving replies from a server in accordance with an embodiment of the present invention. The process begins at step 802 in which the client is started, i.e. the client begins the process of sending a request to a server. In step 804, a client thread of the "grabs," i.e. acquires, the write lock for the connection it wishes to use. This client thread will be referred to herein as the current client thread. In some embodiments, there may only be one connection between a client and a server. Hence, there may be only one write lock. The current client thread is the client thread which will be used to send a request to the server. After the current client thread acquires the write lock for the connection, process control proceeds to step 806 where the client thread writes the request on the connection. Writing the request on the connection typically entails encapsulating the request in a marshal, or network, buffer in order to send the request to an appropriate end point on the server side. After the request is written on the connection, the write lock for the connection is released by the current client thread in step 807.

In step 808, it is determined whether a reply to the request is expected. If a reply is not expected by the client, then, once the request has been written on a connection, the processing of a request by the client is considered to be completed. If a reply to the request is expected, then, a response record is created for the expected reply. This response record is then added to the response list for the connection on which the request was sent. The structure of a typical response record will be described with reference to FIG. 9 below. The response list is a listing of all current responses or replies which are expected on a connection. Each connection has a specific response list, and each response list has a mutex lock.

Once a response record is created in step 812, process control proceeds to step 813 which is the determination of whether the response list has a length of one. It should be appreciated that, together, the step of creating a response record and adding the response record to a response list, and the step of checking the length of the response list, are "atomic"; that is, the steps happen consecutively to avoid any intervention which may occur if new response records are added while the length of the response list is being checked. Such intervention may lead to an incorrect determination of the length of the response list when it is checked.

If the determination in step 813 is that the length of the response list is one, then the only reply expected on the connection is the reply expected by the current client thread. That is, there is only one response record in the response list. If there is only one response record in the response list, process control proceeds to step 818 where the current client thread "waits" for a reply on the connection. In the described embodiment, the reply corresponds to a read/reply event. Until a reply, typically encapsulated in a marshal buffer, is received from the server, the current worker thread remains inactive. When a reply is received from the server, the current worker thread becomes active, and process flow moves to step 822 which is the step of reading the reply header. Methods used to get information contained in a marshal buffer or the like may include "peek" methods. Peek methods are often used to gather information from a reply without actually having to extract the information. That is, peek methods may be used to peek at the reply header.

Information contained in the header of the reply sent from the server includes information which identifies the client thread which should receive the reply. For the case in which it was determined in step 813 that only the current client thread is awaiting a response, the determination in step 824 of whether the reply belongs to the current worker thread is expected to be affirmative. However, in some instances, it is possible that the response list may have been updated, most likely because a new response record was added, after the length of the response list was checked in step 813. Response records may be added and removed at any time due to the fact the requests and replies may be multiplexed on the same connection. If it is determined in step 824 that the reply belongs to the current client thread, process control moves to step 826 in which the body of the reply is read. Once the body of the reply is read, process control proceeds to step 828 where the record pertaining to the current client thread is removed from the response list in order to indicate that the reply expected by the this client thread has been received. After the response record is removed from the response list, a check is made in step 830 to determine if the response list for the connection is empty. If it is determined that the response list is empty, there are no more replies expected on the connection, and the process of sending a request to the server and receiving a reply from the server is completed.

If the check made in step 830 results in the determination that the response list is not empty, then at least one more reply is expected from the server. Even in the case where the determination of the length of the response list in step 813 was that the length of the response list was one, the removal of the response record corresponding to the current thread in step 828 may not result in an empty response list. As was previously mentioned, it is possible that additional response records were added to the response list at some point after the length of the response list was checked in step 813 in association with the current thread. If it is determined that the response list is not empty, a response record is selected from the response list in step 832. In some cases, the selection of a response record may be made based upon which response record is listed first in the response list. In other cases, the selection of a response record may be based upon heuristics that help to determine which client thread or request will be the most likely recipient of the next response. By way of example, heuristics may be based on any number of factors, including, but not limited to, the response record which has been on the response list for the longest amount of time, the response record which has been on the response list for the shortest amount of time, etc.

After a response record is selected, a listen event is sent to the client thread which is identified by the thread identifier (ID) which is present in the header of the response record. That is, the current thread sends a listen event to the client thread which is appropriate for receiving the reply. The thread identifier, which identifies the client thread that transmitted the request corresponding to the request record, is implicit in the response record, and will be described below with respect to FIG. 9. After a listen event is sent to an appropriate client thread, the steps which must be executed by the current client thread in the current process are essentially completed.

Returning to the determination of whether a reply received on the connection is a reply for the current client thread in step 824, the reply received on the connection may be a reply for another thread which uses the same connection. If the reply received on the connection is not a reply for the current client thread, process control moves to step 836 where the appropriate thread is determined. The appropriate thread may be determined from the header of the reply. Once the appropriate thread is determined, the read-reply event is sent to the appropriate thread in step 838. The current worker thread sends, or transmits, the read-reply event to another thread. This usually results in a context switch.

After the read-reply event is sent to the appropriate thread, process control proceeds to step 820 where the current client thread "waits" for an event to occur. As previously mentioned, waiting for something to occur entails remaining inactive until activity occurs on the connection. An event may be any type of activity which occurs on the connection. Activities include, but are not limited to, listen events and read-reply events. A listen event is typically a transmission from a client thread which indicates to another client thread that the other client thread should be prepared to receive a read-reply event which will follow. A read-reply event is a reply sent from the server which may then be read by the client.

When an event is delivered to a client thread that is waiting for an event, the client thread checks whether the event is a listen event step 821. If the activity is a listen event, process control proceeds to step 818 which, as described earlier, is the step of the current client thread waiting on the connection for a reply, or a read-reply event. In the described embodiment, if it is determined in step 821 that the activity is not a listen event, then the activity is a read-reply event. Hence, process control moves to step 822 where the header of the reply is read. After the header of the reply is read, the remainder of the steps in the process of a client thread of a client dispatching a request to and receiving a reply from a server are as described above.

As described earlier, the length of the response list corresponding to a connection may not be equal to one, which is often the case if replies and requests are multiplexed on a connection. Returning to the determination of the length of the response list in step 813, if it is determined that the length of the response list is not equal to one, process control moves to step 820, where, as described earlier, the current client thread remains inactive until such time that an event occurs on the connection. After the step of waiting on the connection for a reply, the remainder of the steps in the process of receiving a reply from a server are as described above.

Figure 9:
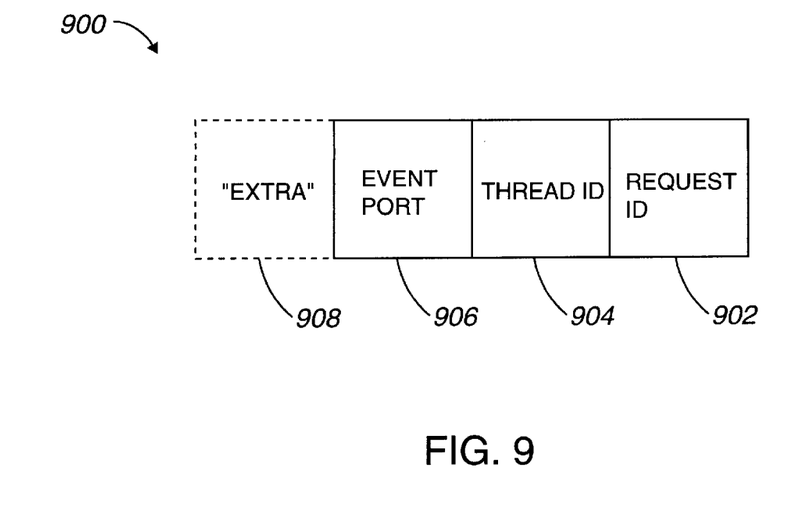
FIG. 9 is a diagrammatic representation of a data structure for a response record in accordance with one embodiment of the present invention.

Referring next to FIG. 9, a response record data structure in accordance with an embodiment of the present invention will be described. A response record 900, as mentioned above, is created for each request transmitted from a client which requires a reply from a server. Response record 900 may include a request identifier (ID) 902, a thread identifier (ID) 904, and an event port 906. Response record 900 may further include "extra" information 908. Request ID 902 is an identifier which uniquely identifies response record 900. In some embodiments, request ID 902 may correspond to the time a request was made. Thread ID 904 is a unique identifier which corresponds to the thread which issued the request that corresponds to response record 900.

Event port 906 is generally an implementation state, or an address that is related to an implementation state. In some embodiments, event port 906 may serve as a flag which indicates whether an event which corresponds to response record 900 has occurred on the connection with which response record 900 is associated. That is, event port 906 may serve as a flag which, when set to indicate that an event pertaining to response record 900 has occurred, serves to take the client thread which is monitoring the associated connection out of a wait state as described earlier. In other embodiments, event port 906 may contain pointers to additional states which may indicate that an event has occurred. In still other embodiments, event port 906 may be an address which is monitored in order to determine when a reply is sent on the connection. "Extra" information 908 corresponds to any information, not including information provided by request ID 902, thread ID 904, or event port 906, which may be pertinent to receiving and correctly routing a reply received by the client from the server. Extra information 908 may either include methods used to set priorities, or a priority value which provides the priority for selecting the response record from the list. Priority may be based on any number of factors, including, but not limited to, the response record which has been on the response list for the longest amount of time, the response record which has been on the response list for the shortest amount of time, etc.

Priorities are typically assigned to replies in three different ways. One way in which priorities may be assigned involves random assignment. A second way in which priorities may be assigned is on a first come first serve basis. That is, the order in which priorities are assigned is based upon the order in which requests are transmitted to the server. A third way in which priorities may be assigned involves decrementing priorities. If priorities are to be assigned using decrementing priorities, replies may initially be assigned priorities either based on a first come first serve basis, or based on a random basis. Then, for every reply that is received on a connection, each time the reply associated with a particular response record is not received, the priority for that reply is reduced.

Figure 10:
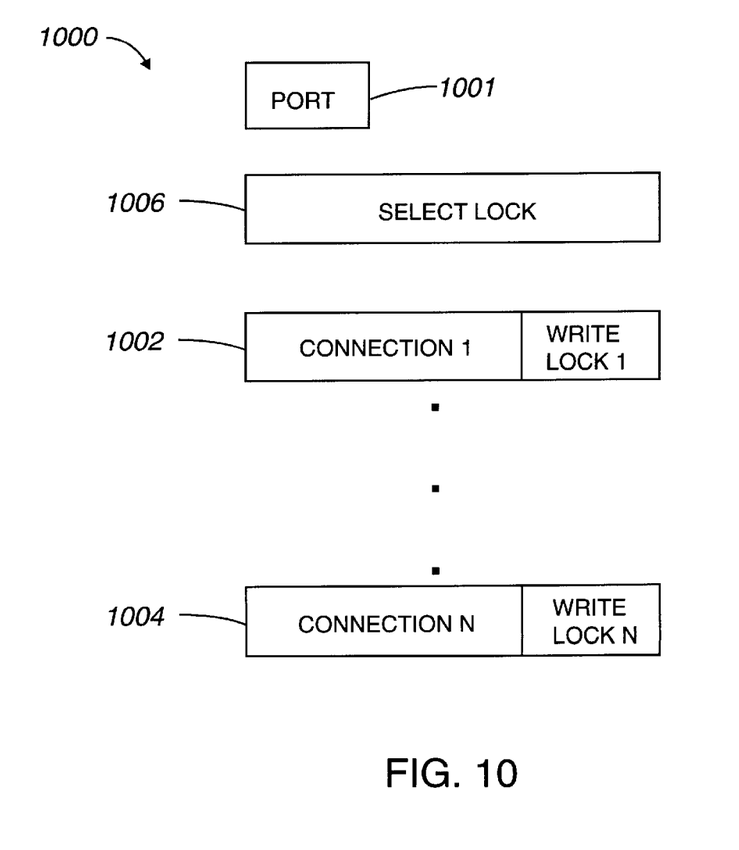
FIG. 10 is a diagrammatic representation of a data structure for a server side end point in accordance with one embodiment of the present invention.

FIG. 10 is a diagrammatic representation of a server side end point data structure in accordance with an embodiment of the current invention. Server side end point data structure 1000 includes a port 1001 on which connections are accepted and a list of connection structures, which, for example, may include connection-1 1002 and connections-N 1004. This list typically starts in an empty state and grows as connections are accepted, and shrinks as connections are torn down. Each connection structure may include a write lock which, when acquired by a worker thread, enables only the worker thread that possess the write lock to send a reply on the connection. Server side end point 1000 also includes a mutex select lock 1006. The worker thread which acquires the select lock is the only thread which is allowed to monitor activity on a connection, as for example either connection-1 1002 or connection-N 1004, on server side end point 1000.

Although only one embodiment of the present invention has been described, it should be understood that the present invention may be embodied in many other specific forms without departing from the spirit or the scope of the present invention. In the described embodiment, a method by which worker threads operate on the server side of a client-server system has been described. It should be appreciated that the method by which worker threads operate may be widely varied within the scope of the present invention. By way of example, steps involved with the methods by which worker threads operate may be reordered. Steps may also be removed or added without departing from the spirit or the scope of the present invention. Similarly, methods of dispatching service requests and processing service requests may also be widely varied within the scope of the present invention.

Additionally, in the described embodiment, specific data structures for the response records and server side end points have been described. It will be apparent that these data structures may be widely varied within the scope of the present invention. Therefore the described embodiments should be taken as illustrative and not restrictive, and the invention should be defined by the following claims and their full scope of equivalents.

What is claimed:

1. In a multi-threaded distributed object system having threads adapted to service requests, a method of processing a request for service from a client, the request including a header and a message, the method comprising:

listening for a request using a first server side thread, the first server side thread being arranged to listen for requests for new connections, to listen for new requests for services, and to process requests for services on a connection of a server side end point of a server;

reading the header of the request using the first server side thread, the header of the request containing information pertaining to the message contained in the request;

determining when the first server side thread is effective for processing the request;

reading the message contained in the request; and servicing the request, wherein the request is serviced using the first server side thread when it is determined that the first server side thread is effective for processing the request.

2. A method as recited in claim 1 further comprising:

determining whether the message contained in the request is long;

removing the connection from a connection list which lists all connections on the server side end point prior to reading the message contained in the request when it is determined that the message contained in the request is long; and adding the removed connection back to the connection list after reading the message contained in the request.

3. A method as recited in claim 1 further comprising:

determining whether the request for service requires a reply to be returned to the client; and sending a reply to the client when it is determined that the request for service requires a reply to be returned to the client.

4. A method as recited in claim 1 wherein servicing the request includes dispatching the request to a second server side thread with the capability of both listening for requests and servicing requests, the second server side thread being appropriate for servicing the request when the first server side thread is determined to be ineffective for processing the request.

5. A method as recited in claim 1 further comprising:

determining whether too many threads with the capability of both listening for requests and servicing requests are associated with the server side end point; and terminating the first server side thread when it is determined that there are too many threads with the capability of both listening for requests and servicing requests.

6. A method as recited in claim 1 further comprising creating at least one new thread with the capability of both listening for requests and servicing requests.

7. A method as recited in claim 6 further comprising determining whether any threads with the capability of both listening for requests and servicing requests are available before the step of creating the new thread, such that the new thread is created in response to a determination that no threads with the capability of both listening for requests and servicing requests are available.

8. A method as recited in claim 1 further comprising:

writing the request for service on a connection between the client and the server using a first client side thread which is effective for dispatching requests and listening for replies to the request;

determining whether a reply from the server is expected in response to the request for service;

creating a response record which corresponds to the request for service when it is determined that a reply from the server is expected; and adding the response record to a response list which includes all response records for the client.

9. A method as recited in claim 8 further comprising processing a reply from the server.

10. A method as recited in claim 9 wherein processing a reply from the server includes:

waiting on the connection for the reply from the server;

determining whether the first client side thread is appropriate for receiving the reply from the server;

dispatching the reply from the server to a second client side thread with the capability of both dispatching requests and listening for replies when it is determined that the first client side thread is inappropriate for receiving the request; and reading the reply using the second client side thread.

11. A method as recited in claim 10 further comprising removing the response record from the response list.

12. A computer program product for processing requests for service within a multi-threaded distributed object system, the computer program product comprising:

computer code arranged to listen for a request for service which includes a header and a message using a first server side thread, the first server side thread being arranged to listen for and to process requests on a connection of a server side end point of a server;

computer code arranged to read the header of the request using the first server side thread, the header containing information pertaining to the message contained in the request;

computer code arranged to determine whether the first server side thread is effective for processing the request;

computer code arranged to read the message contained in the request;

computer code arranged to service the request, wherein the computer code is arranged to service the request using the first server side thread when it is determined that the first server side thread is effective for processing the request; and a computer readable medium that stores the computer codes.

13. A computer program product as recited in claim 12, the computer program product further including computer code that dispatches the request to a second server side thread with the capability of both listening for requests and servicing requests, the second server side thread being arranged for servicing the request when the first server side thread is determined to be ineffective for processing the request.

14. A computer program product as recited in claim 12, the computer program product further including:

computer code arranged to write the request on a connection between a client and the server using a first client side thread which is effective for dispatching requests and listening for replies to the request;

computer code arranged to determine whether a reply from the server is expected in response to the request;

computer code arranged to process the reply from the server when it is determined that a reply from the server is expected;

computer code arranged to wait on the connection for the reply from the server when it is determined that a reply from the server is expected;

computer code arranged to determine whether the first thread is appropriate for receiving the reply from the server when it is determined that a reply from the server is expected;

computer code arranged to dispatch the reply from the server to a second client side thread with the capability of both dispatching requests and listening for replies when it is determined that the first client side thread is inappropriate for receiving the reply; and computer code arranged to read the reply using the second thread when it is determined that the first client side thread is inappropriate for receiving the reply.

15. A computer program product as recited in claim 12, the computer program product further including:

computer code arranged to transmit the computer codes over a network to a remote location.

16. A distributed object system capable of processing a request for service, the distributed object system comprising:

a central processing unit;

memory that is allocated for processing the request for service;

a client arranged to dispatch the request for service to a server using an object request broker which provides transport mechanisms necessary to dispatch the request for service;

at least one server side thread resident in the memory, the server side thread having the capability of both listening for and processing requests for service, wherein the server side thread is associated with transport mechanisms on the server; and at least one client side thread resident in the memory, the client side thread having the capability of both dispatching requests for service and listening for replies to requests for service, wherein the client side thread is associated with transport mechanisms on the client.

17. A computer apparatus for use in processing requests for service within a distributed object system, the computer apparatus comprising:

a central processing unit;

an input/output device coupled to the central processing unit;

random access memory in communication with the central processing unit, the random access memory including at least one thread with the capability of listening for requests, determining whether the at least one thread is suitable for processing the requests, and processing the requests when it is determined that the at least one thread is suitable for processing the requests; and a mass storage device in communication with the central processing unit.

18. A computer apparatus as recited in claim 17 further comprising at least one client side thread with the capability of both dispatching requests and listening for replies in response to dispatched requests.

19. A computer apparatus for use in processing requests for service within a distributed object system, the computer apparatus comprising:

a central processing unit;

an input/output device coupled to the central processing unit;

random access memory in communication with the central processing unit, the random access memory including at least one client-side thread with the capability of both dispatching requests and listening for replies in response to dispatched requests; and a mass storage device in communication with the central processing unit.

* * * * *